US012773772B2

(12) United States Patent
Westgarth et al.

(10) Patent No.: US 12,773,772 B2
(45) Date of Patent: Oct. 27, 2026

(54) INSERTION TOOL WITH ROTATION INTERFACE

(71) Applicants: General Electric Company, Schenectady, NY (US); Oliver Crispin Robotics Limited, Altrincham (GB)

(72) Inventors: Grant David Paul Westgarth, Newport (GB); Andrew Crispin Graham, Badminton (GB)

(73) Assignees: General Electric Company, Schenectady, NY (US); Oliver Crispin Robotics Limited, Altrincham (GB)

( * ) Notice: Subject to any disclaimer, the term of this patent is extended or adjusted under 35 U.S.C. 154(b) by 0 days.

(21) Appl. No.: 18/651,353

(22) Filed: Apr. 30, 2024

(65) Prior Publication Data

US 2025/0332704 A1 Oct. 30, 2025

(51) Int. Cl.
*B25B 33/00* (2006.01)
*B25B 13/48* (2006.01)
(Continued)

(52) U.S. Cl.
CPC .............. *B25F 5/02* (2013.01); *B25B 13/481* (2013.01); *B25B 33/00* (2013.01); *F01D 25/00* (2013.01);
(Continued)

(58) Field of Classification Search
CPC ......... B25F 5/02; B25B 5/006; B25B 13/481; B25B 13/52; B25B 23/0021; B25B 33/00;
(Continued)

(56) References Cited

U.S. PATENT DOCUMENTS 7,033,979 B2 4/2006 Herwig
7,171,279 B2 1/2007 Buckingham
(Continued)

FOREIGN PATENT DOCUMENTS

DE 102013202616 A1 8/2014
DE 102015006330 11/2016
(Continued)

OTHER PUBLICATIONS

"Blade Inspection Tool (BIT) Toolkits Now Available to Order for GEnx Engines", OC Robotics a GE Aerospace Company, Copyright 2022, 5 pgs, https://www.ocrobotics.com/news-en/blade-inspection-tool-bit-toolkits-now-available-to-order-for-genx-engines/.

*Primary Examiner* — Robert J Scruggs
(74) *Attorney, Agent, or Firm* — FITCH, EVEN, TABIN & FLANNERY LLP

(57) ABSTRACT

An insertion tool includes a housing, an elongated section at least partially within the housing, a bendable section coupled to the elongated section at, and an actuator. The actuator is configured to actuate the bendable section, via causing an axial displacement of the elongated section within the housing, from a retracted state at least partially positioned within the housing to an extended state outside of the housing. The insertion tool also includes a tensioning assembly configured to tension the bendable section into a predefined shape in the extended state. The elongated section is coupled to the housing via a rotation interface configured to cause a rotation of the bendable section during the actuation of the bendable section from the retracted state to the extended state.

19 Claims, 10 Drawing Sheets

(51) Int. Cl.
*B25F 5/02* (2006.01)
*F01D 25/00* (2006.01)

(52) U.S. Cl.
CPC ...... *F05D 2230/72* (2013.01); *F05D 2230/80* (2013.01)

(58) Field of Classification Search
CPC ..... B25B 13/48; B25B 21/002; B25B 23/142; B25B 23/147; B25B 23/16; B25J 9/104; B25J 9/06; B25J 9/065; B25J 9/106; B25J 9/1045; B25J 9/1085; B25J 18/02; B25J 18/025; B25J 18/06; B25J 19/00; F01D 25/00; F05D 2230/72; F05D 2230/80; F16L 11/18; F16L 3/015; F16L 9/22; A61M 25/00; A61M 31/00; A61M 37/00; A61B 1/005; A61B 1/0051; A61B 1/008; A61B 17/00; G02B 23/2476; B25G 1/002; B25G 1/02; B25G 1/04; B25G 1/10
See application file for complete search history.

(56) References Cited

U.S. PATENT DOCUMENTS

| | | | | |
|---|---|---|---|---|
| 7,543,518 | B2 | 6/2009 | Buckingham | |
| 7,905,920 | B2 * | 3/2011 | Galea | A61F 2/4455 623/17.13 |
| 8,028,936 | B2 | 10/2011 | Mcdermott | |
| 8,277,647 | B2 | 10/2012 | Rice | |
| 8,714,038 | B2 | 5/2014 | Moran | |
| 9,138,782 | B2 | 9/2015 | Dorshimer | |
| 9,585,720 | B2 * | 3/2017 | Hatakeyama | A61B 34/77 |
| 9,715,100 | B2 | 7/2017 | Konomura | |
| 9,739,168 | B2 | 8/2017 | Ekanayake | |
| 9,926,517 | B2 | 3/2018 | Tibbetts | |
| 9,932,854 | B1 | 4/2018 | Tibbetts | |
| 9,951,647 | B2 | 4/2018 | Rawson | |
| 9,957,066 | B2 | 5/2018 | Bewlay | |
| 10,005,111 | B2 | 6/2018 | Eriksen | |
| 10,018,113 | B2 | 7/2018 | Bewlay | |
| 10,227,891 | B2 | 3/2019 | Eriksen | |
| 10,323,539 | B2 | 6/2019 | Bewlay | |
| 10,377,968 | B2 | 8/2019 | Brooks | |
| 10,385,723 | B2 | 8/2019 | Flynn | |
| 10,634,004 | B2 | 4/2020 | Giljohann | |
| 10,669,885 | B2 | 6/2020 | Pecchiol | |
| 10,775,315 | B2 | 9/2020 | Mekala | |
| 10,920,181 | B2 | 2/2021 | Martin | |
| 11,027,317 | B2 | 6/2021 | Tibbetts | |
| 11,371,437 | B2 | 6/2022 | Hawke | |
| 11,441,446 | B2 | 9/2022 | Rawson | |
| 11,613,003 | B2 | 3/2023 | Graham | |
| 11,692,650 | B2 | 7/2023 | Graham | |
| 11,752,622 | B2 | 9/2023 | Graham | |
| 2011/0098758 | A1 * | 4/2011 | Stoy | A61F 2/4611 606/86 A |
| 2013/0199040 | A1 | 8/2013 | Dudeck | |
| 2014/0243983 | A1 * | 8/2014 | Galea | A61F 2/4611 623/17.16 |
| 2015/0159122 | A1 | 6/2015 | Tibbetts | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2018/0149038 | A1 | 5/2018 | Eriksen | |
| 2018/0155060 | A1 | 6/2018 | Dauenhauer | |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0355751 | A1 | 12/2018 | Tibbetts | |
| 2019/0054638 | A1 * | 2/2019 | Norton | B25J 9/06 |
| 2019/0153890 | A1 | 5/2019 | Eriksen | |
| 2019/0323378 | A1 | 10/2019 | Tibbetts | |
| 2019/0383158 | A1 | 12/2019 | Diwinsky | |
| 2020/0114528 | A1 | 4/2020 | Graham | |
| 2020/0319119 | A1 | 10/2020 | Peters | |
| 2020/0346310 | A1 | 11/2020 | Huttner | |
| 2021/0108537 | A1 | 4/2021 | Rigg | |
| 2021/0231530 | A1 | 7/2021 | Fuke | |
| 2021/0317752 | A1 | 10/2021 | Deja | |
| 2023/0194234 | A1 | 6/2023 | Graham | |

FOREIGN PATENT DOCUMENTS

| | | | | |
|---|---|---|---|---|
| JP | 2012103711 | | * | 5/2012 |
| JP | 6850937 | | | 3/2021 |
| WO | 2020022474 | A1 | | 1/2020 |
| WO | 2020030516 | A1 | | 2/2020 |

* cited by examiner

INSERTION TOOL WITH ROTATION INTERFACE

FIELD OF THE DISCLOSURE

The present subject matter relates generally to an insertion tool, and more specifically a nonplanar insertion tool.

BACKGROUND

Insertion tools have applications in various industries. The tools can be used for inspection, manufacturing, servicing, and the like. The effectiveness of these tools often depends on their ability to reach difficult areas. In aviation, insertion tools can be used to inspect, service, and/or repair assembled engines through annular openings.

BRIEF DESCRIPTION OF DRAWINGS

A full and enabling disclosure of the present disclosure, including the best mode thereof, directed to one of ordinary skill in the art, is set forth in the specification, which makes reference to the appended figures.

Figure 1:
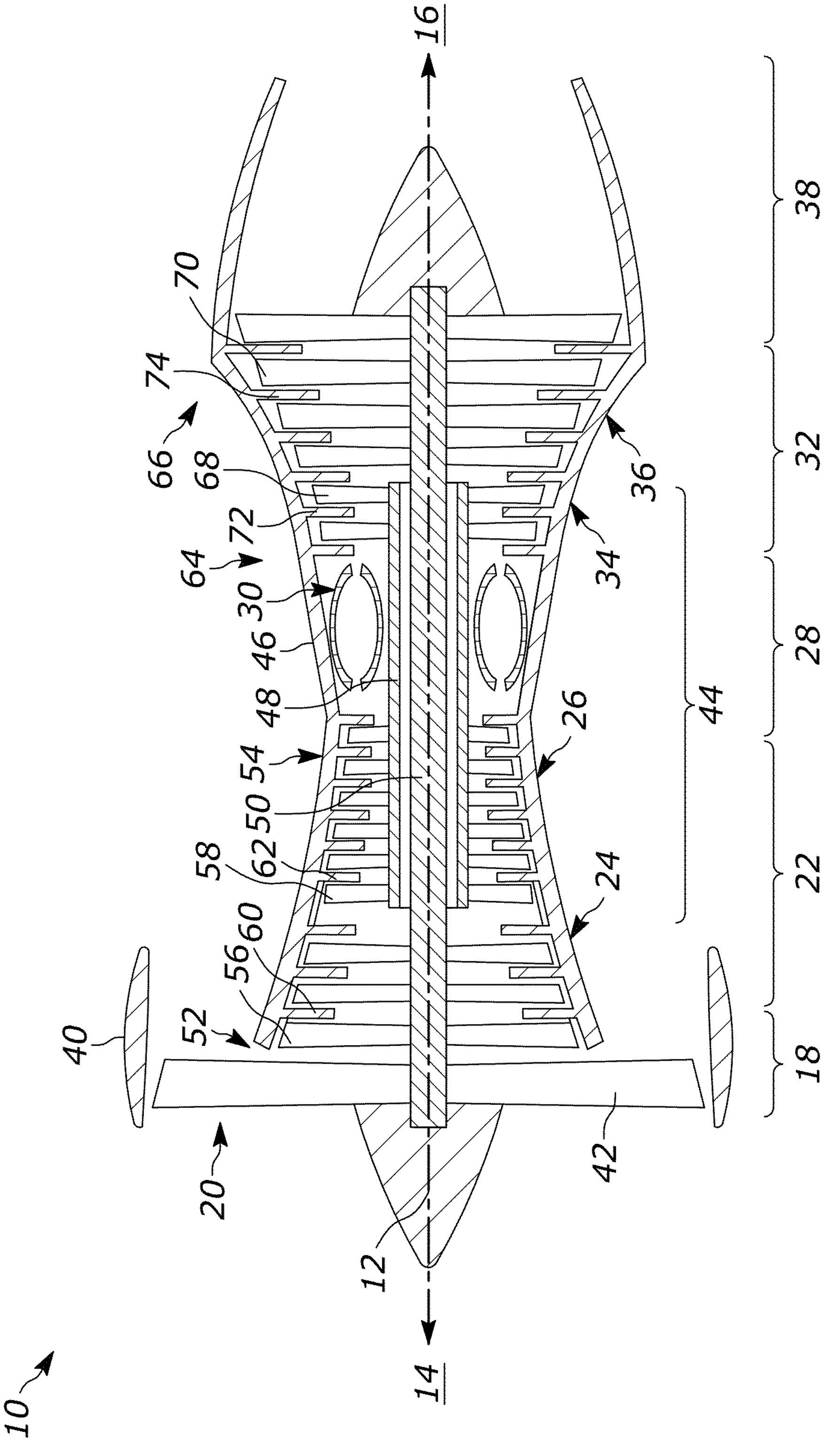
FIG. 1 is a cross-sectional schematic view of a high-bypass turbofan jet engine in accordance with some embodiments of the present disclosure.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/ or steps may be described or depicted in a particular order of occurrence while those skilled in the art will understand that such specificity with respect to sequence is not actually required.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Insertion tools can be used in the service, maintenance, and inspection of interior portions of various devices such as turbine engines. Insertion tools can use planar shapes and deployment paths to consistently position tools, such as cameras, within a confined cavity. Such tools typically utilize a straight articulated arm that bends, or hinges, in one plane and rigidizes into a predefined position. The bending can be caused by applying tensioning force, such as pulling a wire that is disposed within the links of the inspection tool, to tension the links in the direction of the pull force to form a predefined shape. Other ways of causing tension include, but is not limited to using an internal spring, a flexible shaft, or a flexible tube. However, movement of the tip of the tool and the bendable section that can be actuated via tension can be limited. With the increasing complexity of devices, tool paths in and around various components of such devices are complex and may require the tip of the tool to turn in multiple planes during insertion. Designing an insertion tool that can be used in a complex tool path poses a challenge.

Various embodiments of an insertion tool are described herein. In some embodiments, the insertion tool includes a bendable section and a rotation interface, which provides increased maneuverability through complex tool paths. For example, the tip of the tool may simultaneously extend, bend, and rotate relative to an axis of the tool during the insertion of the tool in a tool path such that the tip of the tool traverse curves in more than one plane. In complex devices, such as jet engines, some internal components may only be accessible through a tool path that curves in two or more planes due to the geometries of components adjacent the tool path. An insertion tool described herein can thus be used to access difficult to reach areas within a complex device for inspection, servicing, and/or repair.

Referring now to the drawings, identical numerals indicate the same elements throughout the figures.

FIG. 1 is a schematic cross-sectional diagram of a conventional gas turbine engine 10 for an aircraft in which a servicing, repair, and/or inspection system described herein can operate. The engine 10 has a generally longitudinally extending axis or centerline 12 extending forward 14 to aft 16. The engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34 and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

It will be appreciated that the engine 10 may further define a plurality of openings allowing for inspection, servicing, and/or repair of various components within the engine 10 without disassembling or only partially disassembling the engine 10. For example, the engine 10 may define a plurality of insertion tool openings in the casing 46 at various axial positions within the compressor section 22, combustion section 28, and turbine section 32. Additionally, the engine 10 may include one or more igniter ports within, e.g., the combustion section 28 of the engine 10, that may allow for inspection, servicing, and/or repair of the combustion section 28.

It should further be appreciated that the exemplary engine 10 depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable turbine engine may be serviced, repaired, and/or inspected with the systems and methods described herein. For example, in other exemplary embodiments, the engine 10 may not be a turbofan engine, and instead may be configured as a turboshaft engine, a turboprop engine, turbojet engine, etc., or may be an industrial gas turbine engine for electricity generation, fluid pumping, etc. In some embodiments, the systems and methods described herein may be used for the servicing, repair, or inspection of other aircraft or vehicle components. In some embodiments, the systems and methods described herein may be used in the servicing and/or inspection of any type of devices suspectable to internal surface defects or damages that requires inspection, servicing, and/or repairs.

Figure 2:
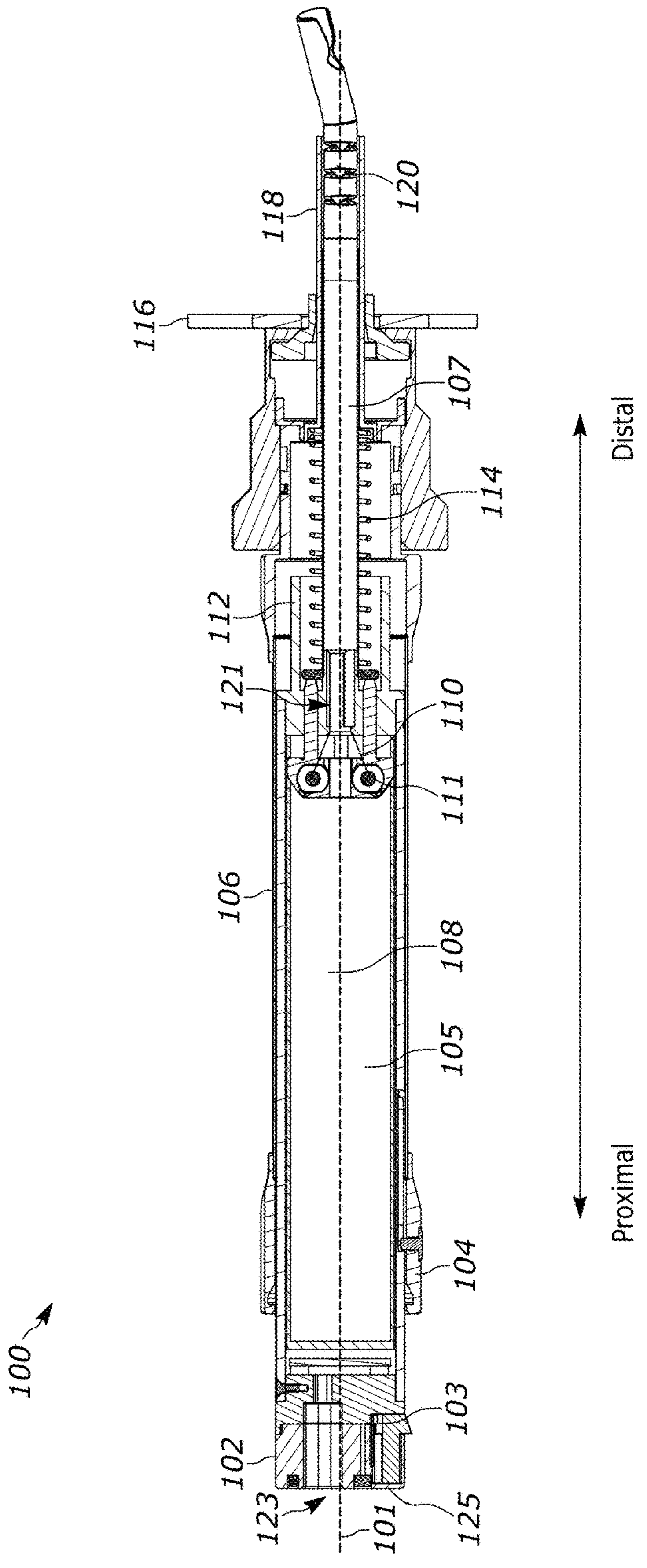
FIG. 2 is a cross-sectional view of an insertion tool in accordance with some embodiments of the present disclosure.
Figure 3:
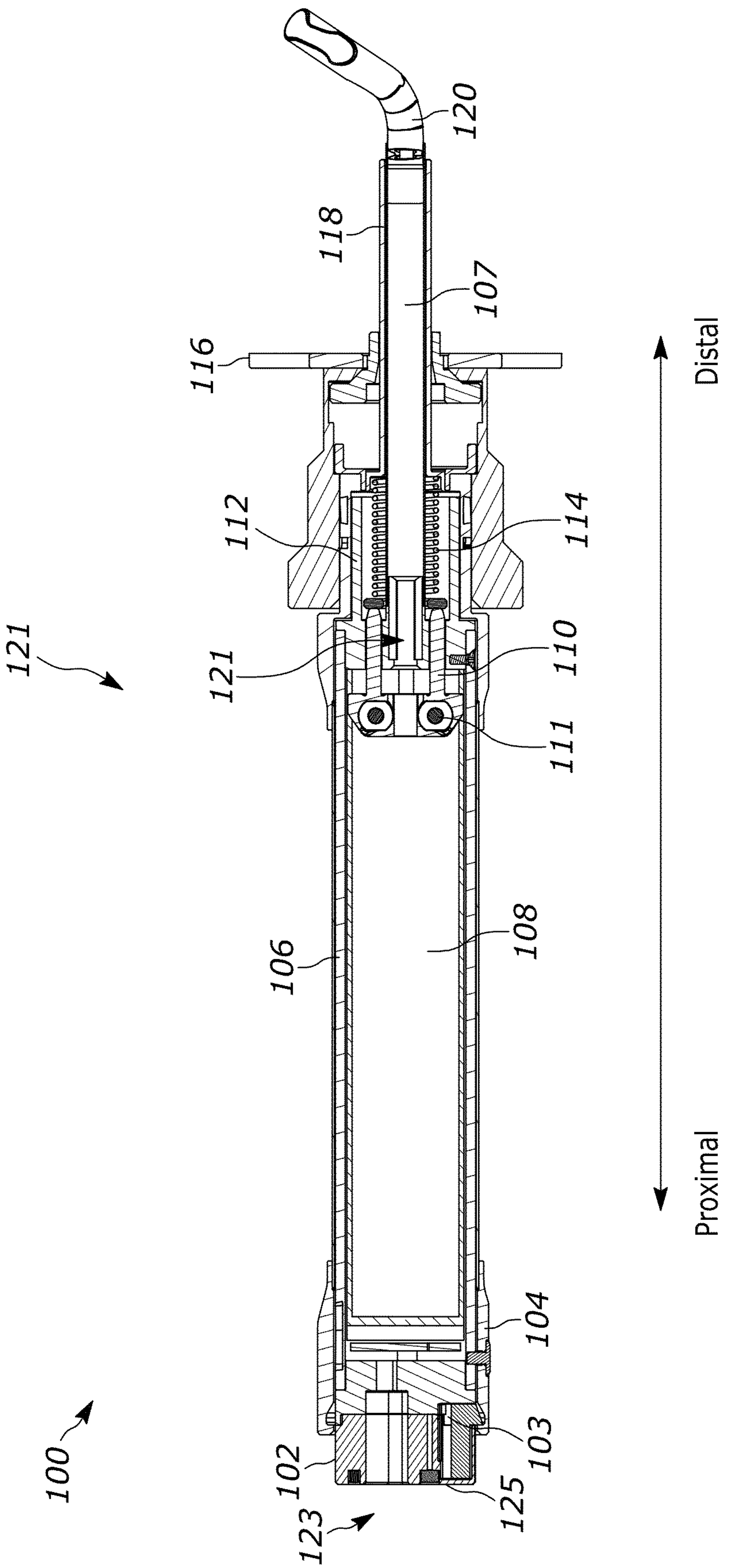
FIG. 3 is a cross-sectional view of the insertion tool of FIG. 2 in an extended state in accordance with some embodiments of the present disclosure.

FIGS. 2 and 3 are an illustration of a cross section of an insertion tool 100 in a retracted state (FIG. 2) and an extended state (FIG. 3) according to some embodiments. The insertion tool 100 includes a housing 106, an elongated section 108 at least partially nested within the housing 106, a bendable section 120 coupled to the elongated section 108, an actuator 102, and a tensioning assembly 112. The same reference numbers in FIGS. 2 and 3 refer to the same parts.

The insertion tool 100 may include an inspection, servicing, and/or repair tool configured to be inserted into a confined cavity to inspect, service, or repair a surface or component within the cavity. In some embodiments, the insertion tool 100 may be an engine inspection, servicing, and/or repair tool sized and shaped to be inserted into an engine through a port and secured to the exterior of the engine to perform operations.

The elongated section 108 is coupled to the actuator 102 on the proximal end of the tool 100 and to the bendable section 120 on the distal end of the tool 100 and is configured to transmit axial and/or rotational motion from the actuator 102 to the bendable section 120. As used herein, the end of the insertion tool 100 that includes the bendable section 120 is referred to as the distal end and the opposite end is referred to as the proximal end. Generally, the insertion tool 100 is inserted with the distal end first, while at least a portion of the proximal end may remain outside of the confined space during operations of the insertion tool 100.

The elongated section 108 is axially slidable and rotatable within the housing 106. In some embodiments, the elongated section 108 may include one or more rigid cylindrical shaft sections for transmitting linear and rotational motion from the actuator 102 to the bendable section 120. In some embodiments, the housing 106 includes a narrow insertion tip 118 within which the bendable section 120 is positioned in a retracted state. In such embodiments, the elongated section 108 may include a wider shaft 105 coupled to the actuator 102 and a narrower rod 107 that is coupled to the bendable section 120 and configured to be inserted into the insertion tip 118 with the movement of the elongated section 108 relative to the housing 106.

The bendable section 120 can include a plurality of links that can move/bend relative to one another. In some embodiments, the links of the bendable section 120 may include end features that are shaped to engage with end features of adjacent links to lock the links into a defined shape when the links are extended out of the narrow insertion tip 118. In some embodiments, the end features are not engaged when the bendable section 120 is retracted inside the narrow insertion tip 118 such that the links may take the shape of the insertion tip 118 instead of the predefined shape. In some embodiments, the bendable section 120 may include links coupled via nonplanar hinges such that when tensioned, the links form a nonplanar shape, that is, a shape that bends in two or more planes. In some embodiments, end features may include protrusions and recesses. Further details of links of a bendable section 120 are provided with reference to FIG. 6 herein.

The tensioning assembly 112 of the insertion tool 100 is configured to tension the bendable section 120 into a predefined shape when the tool 100 is in the extended state. The tensioning assembly 112 includes a rope 110 coupled to the bendable section 120, a rope connection 111, such as a rope clamp, disposed on or within the wide shaft 105 of the elongated section 108 and coupled to the rope 110, and a spring 114 positioned between the rope connection 111 and a portion of the of the housing 106. In some embodiments, the rope 110 is coupled to the tip 122 (FIG. 4) of the bendable section 120. As used herein, the rope 110 may generally refer to various types of connectors such as wires, string, strips of various materials configured to assert a tensioning force on the bendable section 120. In some embodiments, a tensioning assembly 112 may utilize other tensioning mechanisms such as a compression spring or a flexible shaft.

The rope 110 may be inserted through an opening within the spring 114 around the elongated section 108. In some embodiments, the rope 110 may include a single rope that is looped around the tip of the bendable section 120 and coupled to the rope connection 111 on both ends. In some embodiments, the rope 110 may include two ropes each coupled to the rope connection 111 on one end and the tip of the bendable section 120 on the other. In some embodiments, the rope connection 111 is coupled to the spring 114 and is movable relative to the elongated section 108 and/or the housing 106. The spring 114 is positioned around a portion of the rod 107 and asserts a force between the housing 106 and the rope connection 111 within the elongated section 108, opposite to the force applied by the actuator 102. In some embodiments, the spring 114 may further provide a biasing/return force to move the elongated section 108 back towards the proximal end in the absence of a force applied by the actuator 102. In some embodiments, the rope 110 and the spring 114 apply a consistent tension on the bendable section 120 in the retracted state while the bendable section 120 is within the insertion tip 118. That is, in the retracted state, some tension is applied to the bendable section 120, but the bendable section 120 is still bendable and able to follow the straight shape of the insertion tip 118. When the elongated section 108 axially displaces toward the distal end of the insertion tool 100, the spring 114 reduces the amount of axial displacement of the rope connection 111 relative to the housing 106 such that the distance between the rope connection 111 and the bendable section 120 increases. As such, the tension applied by the tensioning assembly 112 on the bendable section 120 increases with the axial displacement of the elongated section, until the links of the bendable section 120 are tensioned into a predefined rigidized shape outside of the insertion tip 118.

The actuator 102 of the insertion tool 100 is configured to actuate the bendable section 120, by causing an axial displacement of the elongated section 108 within the housing 106 along the longitudinal axis 101, from a retracted state (FIG. 2) at least partially positioned within the housing 106 to an extended state (FIG. 3) outside of the housing 106. As discussed above, the axial displacement of the elongated section 108 also causes the tension in the bendable section 120 to increase via the tensioning assembly 112. In some embodiments, the actuator 102 includes a push interface 125 at the proximal end of the elongated section 108 and extending out of the housing 106 such that pushing on the push interface asserts a force on the elongated section 108 along the longitudinal axis 101. In some embodiments, the spring 114 asserts an opposite force (i.e., toward the proximal end) that can retract the bendable section 120 in the absence of a force applied via the actuator 102. In some embodiments, the actuator 102 may be pushed to actuate the tool 100 to an extended state and pulled to retract the tool 100. In some embodiments, the actuator 102 may include a motorized actuator controlled via a signal from an electrical switch and/or a processor-based controller as described in more detail with reference to FIG. 10 herein.

The insertion tool 100 may also include a locking mechanism 103 for locking a position of the elongated section 108 within the housing 106. For example, when the bendable section 120 is fully extended, the locking mechanism 103 may engage to lock the insertion tool 100 in the extended state and at a predefined angle to perform inspection, service, or maintenance of a part. In some embodiments, the locking mechanism 103 is configured to automatically engage and lock the position of the elongated section upon the rotation of the bendable section to a predefined angle. In some embodiments, the locking mechanism 103 may be configured to lock the elongated section 108 within the housing 106 at two or more positions. For example, a first position may correspond to a partial extension of the bendable section 120 while the second position may correspond to a full extension of the bendable section 120. In some embodiments, the locking mechanism 103 is configured to automatically engage and lock the position of the elongated section 108 upon reaching a set amount of axial displacement of the elongated section 108. For example, the locking mechanism 103 may include a spring-loaded pin that is configured to extend into a notch on the elongated section 108 to limit the relative movement of the elongated section 108 and the housing 106 when the notch is rotated/extended to the location of the pin. In some embodiments, the locking mechanism 103 may be manually activated such as by a push button. In some embodiments, the locking mechanism 103 may be actuated via an electric switch or a processor-based controller. In some embodiments, the insertion tool 100 may include a release switch for releasing the locking mechanism 103 to allow for the retraction of the bendable section 120.

The elongated section 108 of the insertion tool 100 is coupled to the housing 106 via a rotation interface 104. In some embodiments, the rotation interface 104 includes a cam and a follower as described in more detail below with reference to FIG. 5. For example, the cam may be a barrel cam with a groove that extends nonlinearly along the axial direction, and the follower may be a pin configured to travel along the groove of the cam. In some embodiments, the rotation interface 104 is configured to cause the rotation of the elongated section 108 and the bendable section 120 along the groove of the cam, with the axial displacement of the elongated section 108 relative to the housing 106. In some embodiments, the actuator 102 may also rotate along the shape of the cam. In some embodiments, the cam is on the elongated section 108 and the follower is on the housing 106. In some embodiments, the cam is on the housing 106 and the follower is on the elongated section 108. The cam may include a nonlinear groove such that the amount of rotation of the bendable section 120 is nonlinear to the amount of axial displacement of the elongated section 108 relative to the housing 106. An example of a nonlinear groove is described with reference to FIG. 5 herein. In some embodiments, the rotation interface 104 may include a motorized rotation joint as described with reference to FIG. 10 herein. The rotation interface 104 may be configured to cause a rotation of the bendable section 120 during the actuation of the bendable section 120 from the retracted state to the extended state. In some embodiments, the rotation interface 104 may be configured to cause the rotation of the bendable section 120 after the bendable section 120 is fully extended.

With the inclusion of the rotation interface 104 between the elongated section 108 and the housing 106, the bendable section 120 may rotate around a longitudinal axis 101 (FIG. 2) of the housing 106 during actuation. Further, the actuation and rotation of the bendable section 120 causes a tip 122 (FIG. 6) of the bendable section 120 to follow a predefined 3D complex path (FIGS. 8A to 9D) as described herein.

As shown in FIGS. 2 and 3, in the retracted state (FIG. 2), the actuator 102 is disposed substantially outside of the housing 106. In some embodiments, the housing may partially or entirely surround the actuator 102 in the retracted state. In this state, the follower of the rotation interface 104 may be at one end of the cam groove. In the extended state (FIG. 3), the actuator 102 is actuated and may be pushed at least partially within the housing 106. The resulting linear displacement of the elongated section 108 causes the follower to travel along the groove on the cam and rotate the elongated section 108 relative to the housing 106, which in turn causes the rotation of the bendable section 120. Also in the extended state, the rod 107 pushes into the insertion tip 118 to push the bendable section 120 out of the insertion tip 118. The extension of the bendable section 120 further causes the tension in the links of the bendable section 120 to increase via the tensioning assembly 112. That is, with a single motion that applies a force on the actuator 102 to cause the axial displacement of the elongated section 108, the bendable section 120 may be simultaneously extended, tensioned, and rotated.

Further, as shown in FIGS. 2 and 3, the insertion tool 100 may include a guide path 121 with an opening 123 in the actuator 102 that extends along the elongated section 108 and to the bendable section 120. The guide path 121 is provided such that an implement 150 (FIG. 4), can be inserted into the opening 123 and through the guide path 121 to the bendable section 120. In this way, various tools can be routed to the bendable section 120 from the actuator 102.

In some embodiments, the insertion tool 100 further includes a stop feature 116 coupled to the housing 106. The stop feature 116 may comprise a plate, a tab, and/or one or more flanges that provides a coupling means to a surface of the component that the opening is disposed in and may, in some instances, be used to avoid over insertion into an opening. For example, the stop features 116 may be anchored to the exterior of an engine casing while the insertion tip 118 is inserted into a tool path.

Figure 4:
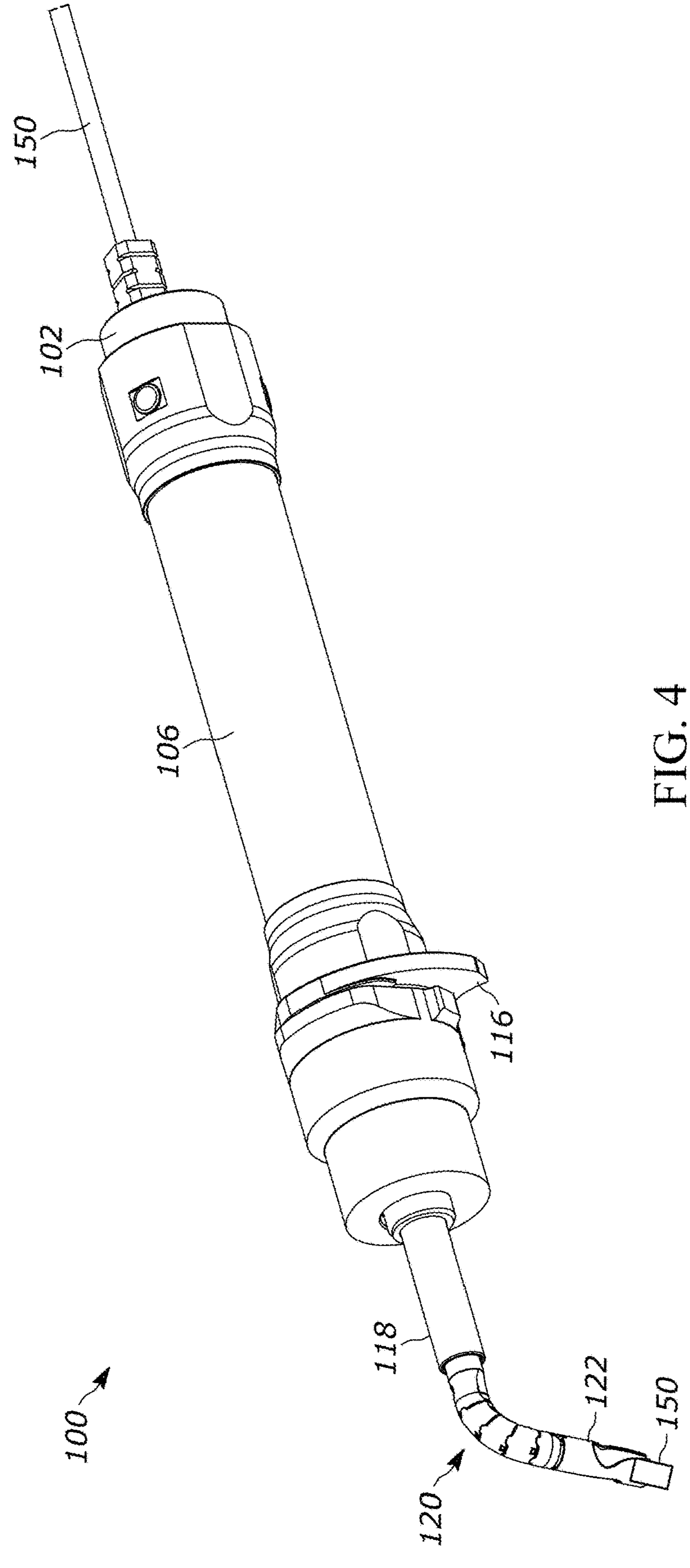
FIG. 4 is a perspective view of an insertion tool in an extended state in accordance with some embodiments of the present disclosure.

Referring to FIG. 4, the insertion tool 100 is illustrated in the extended state according to some embodiments. Same part numbers in FIG. 4 represent same or similar parts in FIGS. 2 and 3, descriptions of which are not repeated herein. FIG. 4 shows the housing 106 enclosing several internal components described with reference to FIGS. 2 and 3. The actuator 102 remains at least partially outside of the housing 106 and has the implement 150 connected through it. As shown in FIG. 4, the bendable section 120, including the tip 122 thereof, is extended out of the insertion tip 118. The implement 150 is shown inserted into the actuator 102 and through the guide path 121, described above with reference to FIGS. 2 and 3, and extending at least partially out of the tip 122 of the bendable section 120. The implement 150 may be, for example, an imaging tool, a scanning tool, a drilling tool, a grinding tool, a spray tool, an inspection tool, a resurfacing tool, a washing tool, a cleaning tool, an eddy current imagining tool, or a fluid tube.

Figure 5:
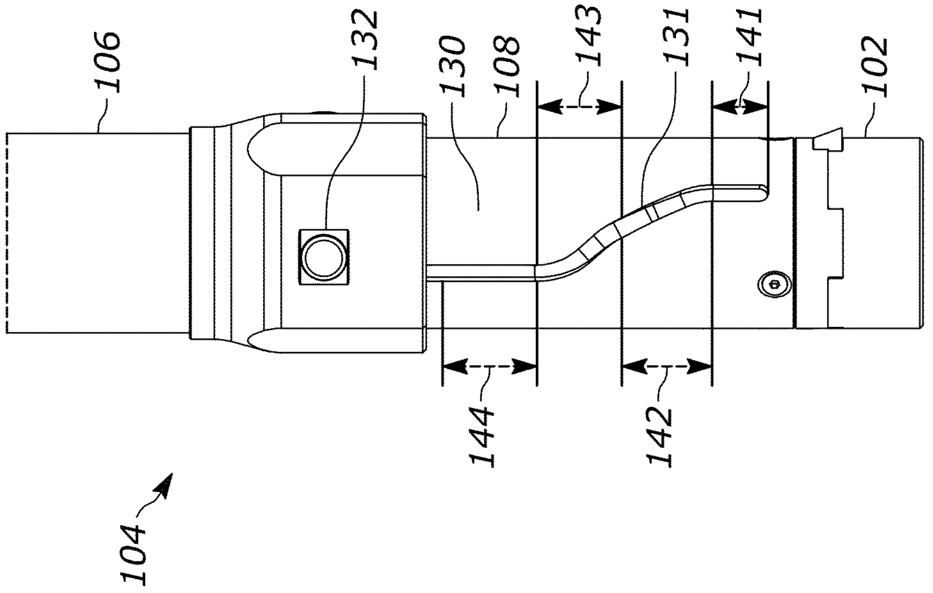
FIG. 5 is an enlarged view of a rotation interface of an insertion tool in accordance with some embodiments of the present disclosure.

Referring to FIG. 5, the rotation interface 104 according to some embodiments is shown. The rotation interface 104 includes a cam 130 and a follower 132. In some instances, the cam 130 is a barrel cam with a groove 131 sized to receive the follower 132. In the embodiment shown in FIG. 5, the follower 132 of the rotation interface 104 is disposed on the housing 106 and the cam 130 having the groove 131 is disposed on the elongated section 108. However, in some embodiments, the groove 131 may be on the housing 106 and the follower 132 may be on the elongated section 108.

The groove 131 may be nonlinear and include multiple portions 141-144. In some embodiments, portions 141-144 of the groove 131 include at least one linear portion and at least one curved portion, at least two portions of different curvatures, at least one compound curve, and/or at least one reverse curve. With the shape of the groove 131 shown in FIG. 5, for example, as the elongated section 108 is actuated into the housing 106, the elongated section 108 will extend in a straight path when the follower 132 travels along the first portion 144 of the groove 131, twist in a first direction (e.g., counterclockwise) while the follower 132 travels along the second portion 143, continue to twist in the first direction but at a reduced rotation speed while the follower 132 travels along the third portion 142, and again follow a straight path when the follower 132 reaches and travels along the fourth portion 141. In some embodiments, the locking mechanism 103 described with reference to FIGS. 2 and 3 may engage to lock the position of the elongated section 108 when the follower 132 reaches the end of the fourth portion 141 of the groove 131. When the locking mechanism 103 is released and force is not applied via the actuator 102, the elongated section 108 moves back towards the proximal end of the insertion tool 100 while rotating in the reverse non-linear path with the follower traversing towards the distal end of the groove 131. The shape of the groove 131 in FIG. 5 is provided as an example only. As noted above, the shape of the groove 131 may be variously configured depending on the use intended for the insertion tool 100. For example, the groove 131 may be shaped based on the complex 3D path of a known insertion path in a device in which the insertion tool 100 is designed to be used. In some embodiments, the bend angle of the bendable section 120 exceeds 90 degrees, such as at least 90 degrees, such as at least 120 degrees, such as at least 150 degrees, such as at least 180 degrees, so that the combination of bending and extension motions causes the implement 150 mounted at the tip 122 of the bendable section 120 to travel in generally a different or the opposite direction to that of the elongated section 108 for at least a portion of its travel.

Figure 6:
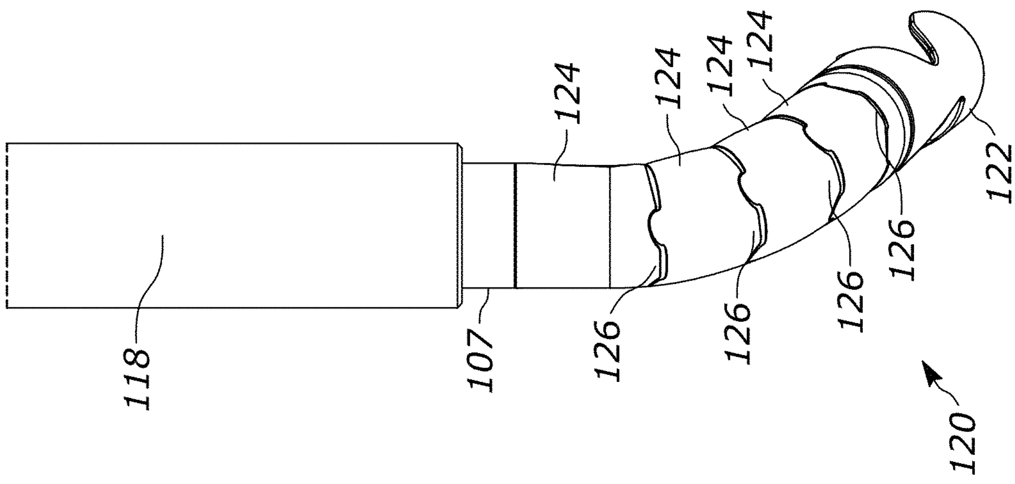
FIG. 6 shows a bendable section of an insertion tool in a rigidized state in accordance with some embodiments of the present disclosure.

Referring to FIG. 6, the bendable section 120 according to some embodiments is shown. The bendable section 120 includes a plurality of rigidizable links 124 forming a rigidizable guide tube. The plurality of rigidizable links 124 are coupled to one another via a plurality of non-planar hinge points 126. The location of the plurality of non-planar hinge points 126 may vary from link to link. The degree of flexibility of each hinge point may also vary from link to link. In this way, similar to the groove 131 described above with reference to FIG. 5, the placement and/or degree of flexibility of the plurality of non-planar hinge points 126 may be modified depending on the use intended for the insertion tool 100. For example, if there is a known insertion path of the insertion tool 100 the plurality of non-planar hinge points 126 may be disposed between the plurality of rigidizable links 124 in such a way to create a predefined shape when the plurality of rigidizable links 124 are tensioned. When rigidized, or deployed, the bendable section 120 may be nonplanar, that is including varying bends/curves in two or more planes. As will be described in more detail below, the plurality of non-planar hinge points 126 disposed between the plurality of rigidizable links 124 allow for a nonplanar articulation of the bendable section 120 and allows for insertion and deployment of the insertion tool 100 into confined spaces which may include a complex insertion path.

Figure 7:
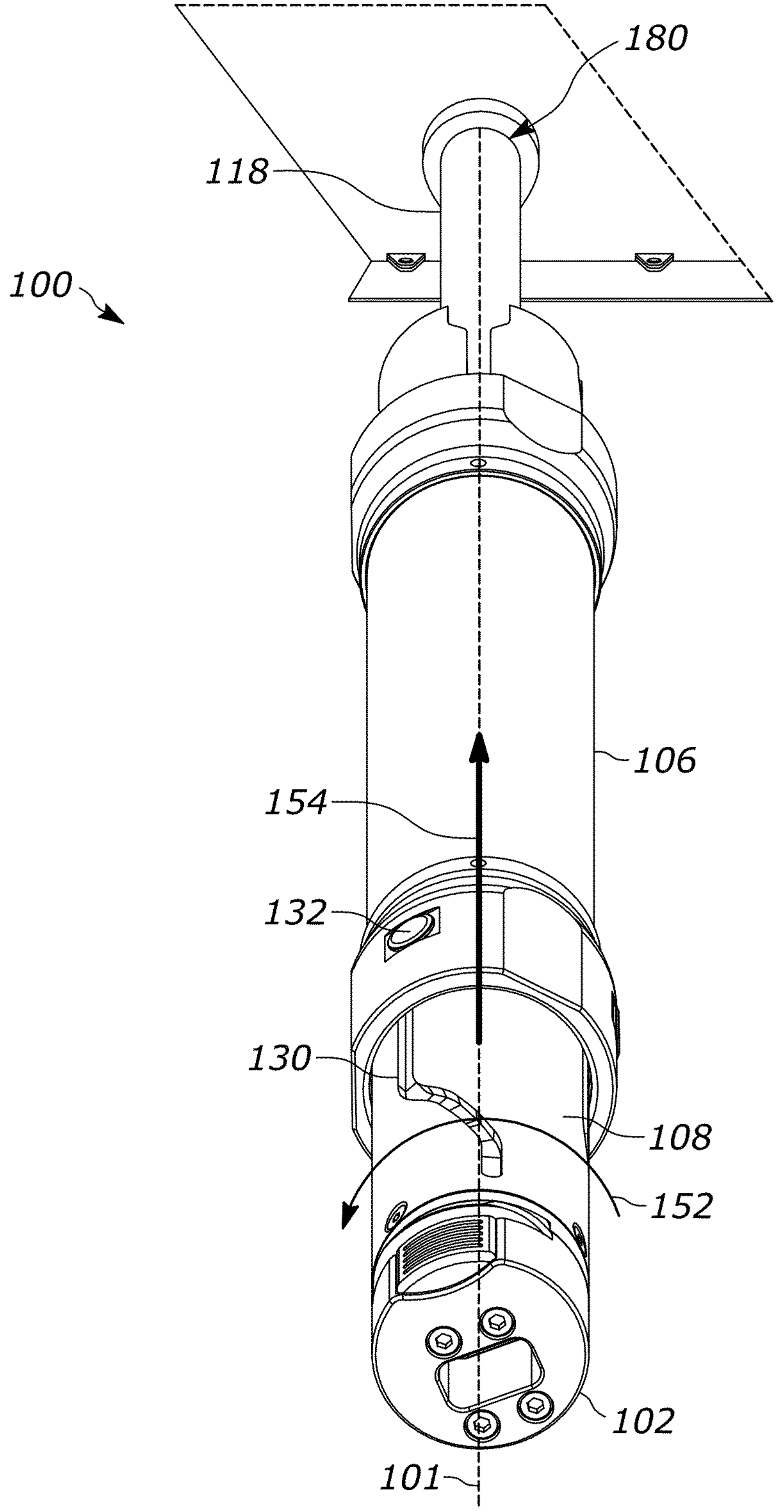
FIG. 7 shows an insertion tool including an axial and rotation movement in accordance with some embodiments of the present disclosure.

Referring to FIG. 7, the insertion tool 100 according to some embodiments is illustrated as inserted into an access port 180 of a turbine engine (e.g., the engine 10 of FIG. 1). The insertion tip 118 is inserted into or coupled to the access port 180. As described above, the insertion tool 100 includes the housing 106, the elongated section 108, the rotation interface 104, and the actuator 102. The housing 106 including the follower 132 is at least partially disposed thereon, and the elongated section 108 including the cam 130 disposed therein. The insertion tool 100, while being actuated, inserts a bendable section 120 (FIGS. 2 and 3) into the access port 180 following a complex insertion path defined by the shapes of the links in the bendable section 120 as shown in FIG. 6 and the shape of the groove 131. Because the groove 131 includes various linear and nonlinear sections, the elongated section 108 undergoes an axial displacement 154 and a radial displacement 152 which in turn drive the extension and rotation of the bendable section 120 within the access port 180. The radial displacement 152 is substantially around or about the longitudinal axis 101 as the insertion tool 100 is being actuated. The axial displacement 154 is substantially in line with the longitudinal axis 101 as the insertion tool 100 is being actuated.

Figures 8A, 8B, 8C:
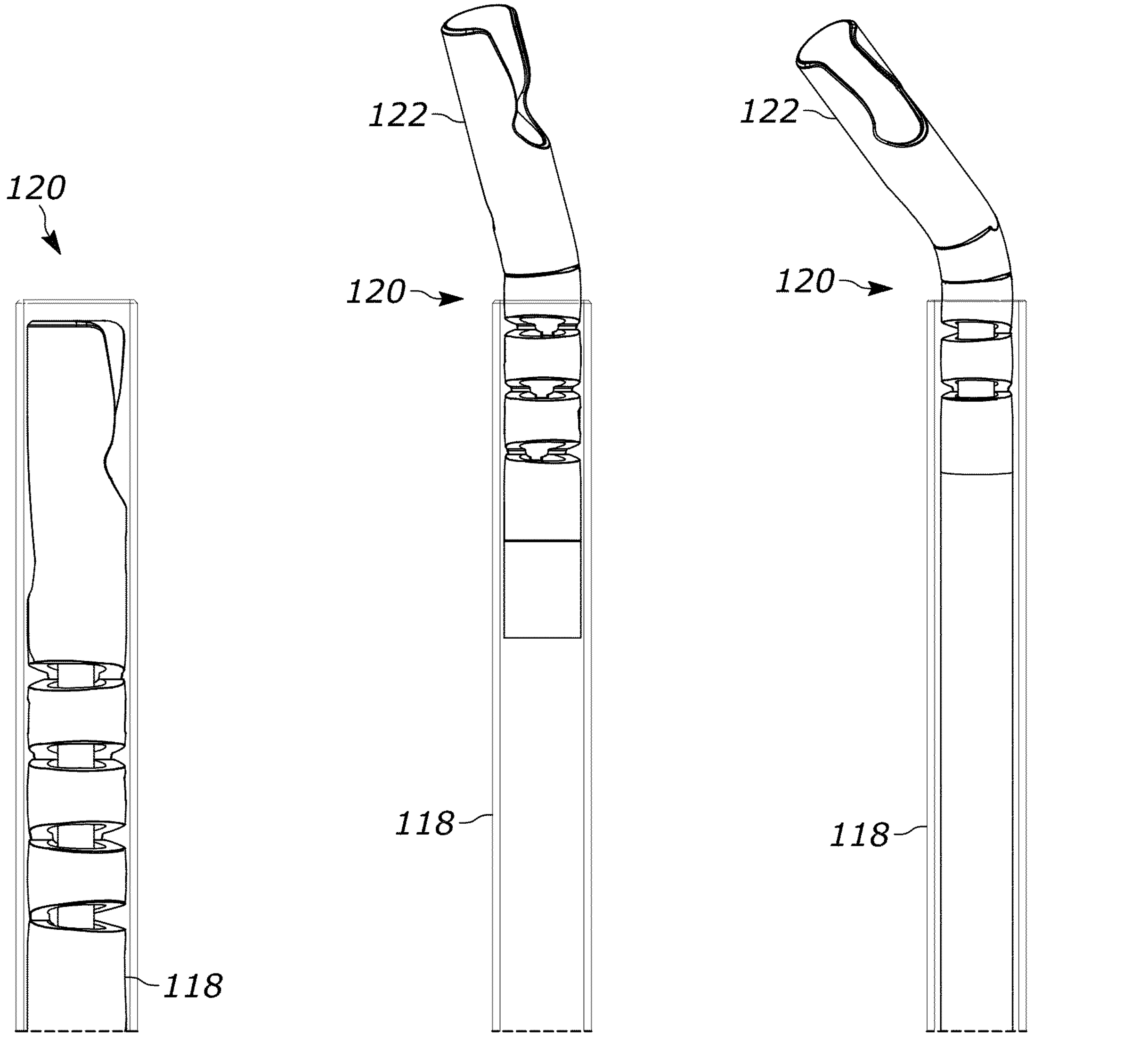
FIGS. 8A, 8B, 8C, 8D, and 8E are illustrations of a bendable section of an insertion tool actuated from a retracted state to an extended state in accordance with some embodiments of the present disclosure.
Figure 8D:
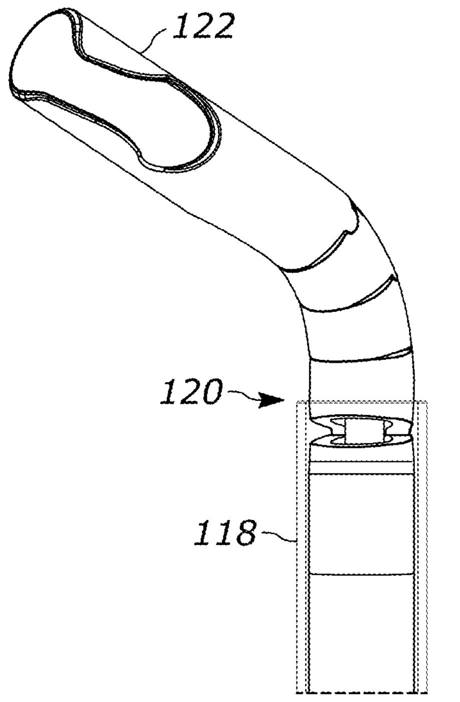
Figure 8E:
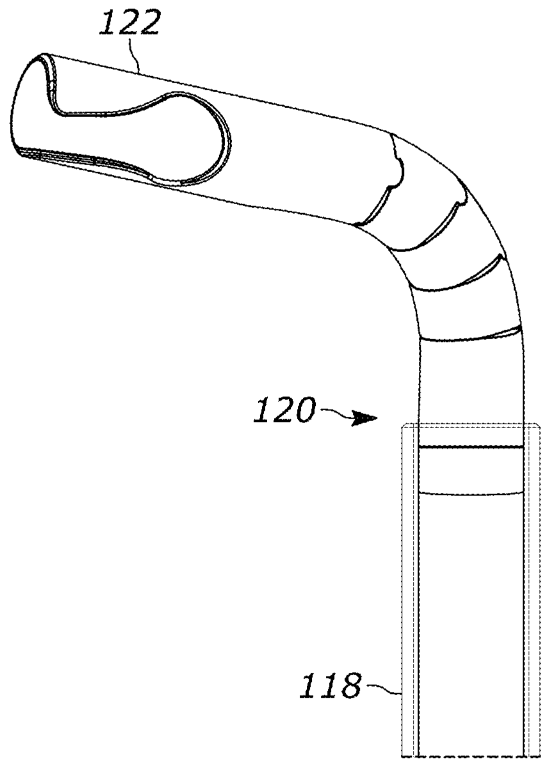
Figure 9A:
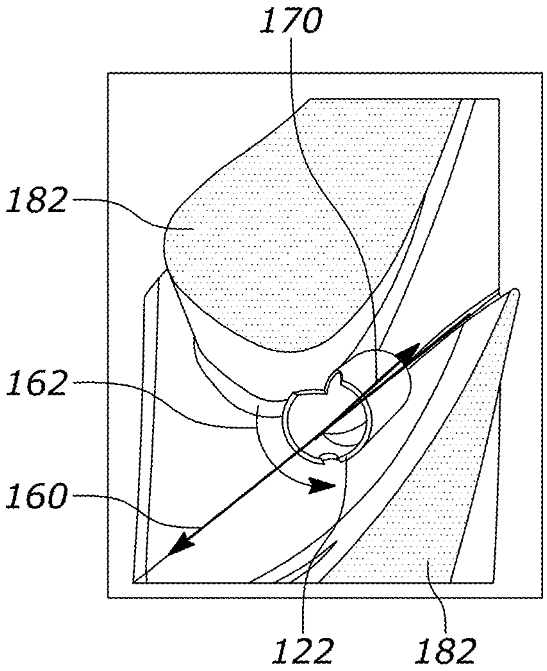
FIGS. 9A, 9B, 9C, and 9D are illustrations of a bendable section in a confined space during the operation of an insertion tool in accordance with some embodiments of the present disclosure.
Figure 9B:
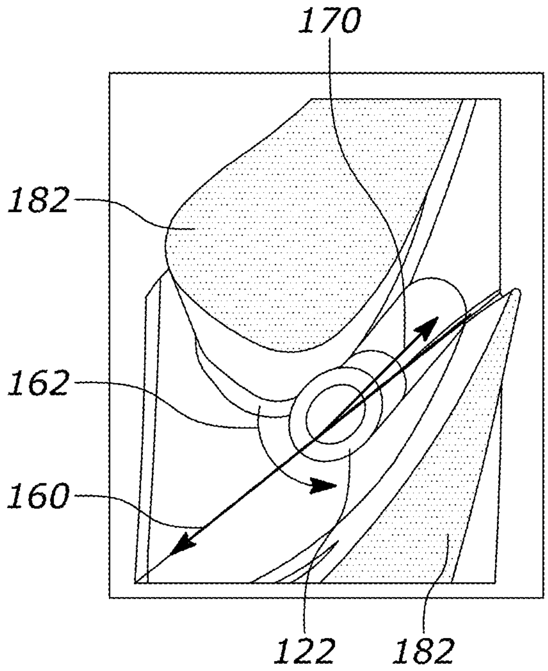
Figure 9C:
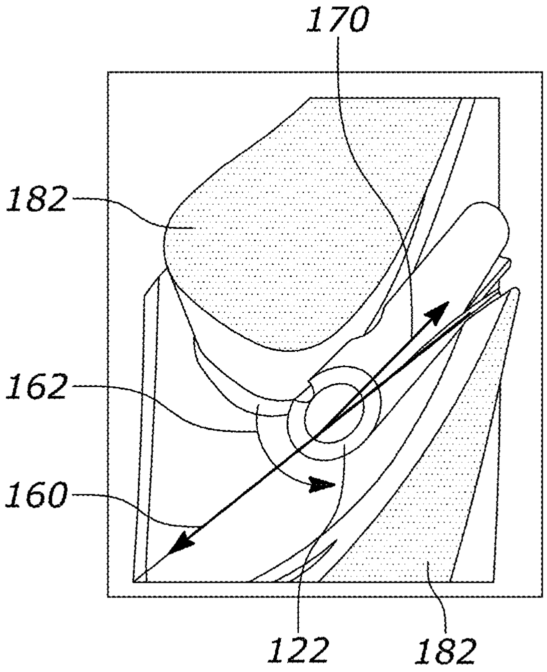
Figure 9D:
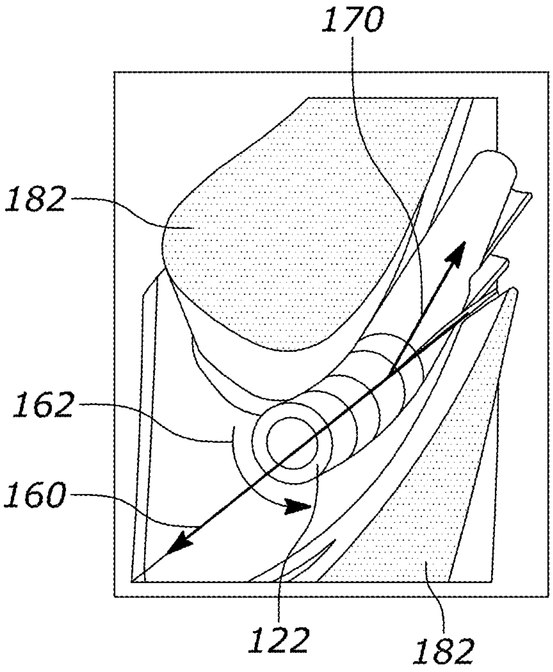

Referring to FIGS. 8A to 8E, an exemplary actuation of the bendable section 120 is shown according to some embodiments. FIG. 8A illustrates the bendable section disposed within the insertion tip 118. In this configuration, the bendable section 120 is in the retracted state, substantially nested within the insertion tip 118 of the housing 106. FIG. 8B illustrates the bendable section 120 in a first extended or actuated state having the bendable section 120, and at least the tip 122 thereof, disposed at least partially out of the insertion tip 118. FIGS. 8C to 8E provide additional illustrations of the bendable section 120, and the tip 122 thereof, in different extended or actuated states. These illustrations provide an exemplary actuation and corresponding insertion path of the bendable section 120 as the insertion tool 100 is actuated by the actuator 102. As can partially be seen, as the bendable section 120 extends further out of the insertion tip 118, the tip 122 follows a nonplanar path as the elongated section 108 (FIGS. 2 and 3), including the bendable section 120 and the tip 122 thereof, undergoes the radial displacement 152 and the axial displacement 154 described above with reference to FIG. 7. That is, in addition to the axial extension out of the 118, the bendable section 120 also rotates radially around an axis of the insertion tip 118. The bendable section 120 further forms a bend in one or more planes through tensioning.

Referring to FIGS. 9A to 9D, an exemplary actuation of the bendable section 120 between two adjacent airfoils 182 of a turbine engine (e.g., the engine 10 (FIG. 1)) is shown according to some embodiments. FIGS. 9A to 9D may be similar to FIGS. 8B to 8E in that the bendable section 120 undergoes a complex 3D nonlinear insertion path around and in between the two adjacent airfoils 182. In FIGS. 9A-D, the direction of insertion is shown with arrow 160, the direction of tensioning is shown with arrow 170, and the direction of rotation is shown with arrow 162. Only the tip 122 of the bendable section 120 of the insertion tool 100 is shown in FIG. 9A-D, the insertion tool 100 may generally be the insertion tool 100 described with reference to FIGS. 2-3 herein.

As shown in FIGS. 9A-9D, the insertion tool 100 is deployed with the insertion of the tip 122 down an insertion path between the two adjacent airfoils 182. As the tip 122 of the bendable section 120 progresses down the insertion path in the direction of arrow 160, the tip 122 pivots with the tensioning of the bendable section 120 in the direction of arrow 170. Simultaneously, the bendable section 120 is rotated about the axis of the tool 100 in the direction of rotation as shown by arrow 162. That is, during the extension of the bendable section 120, the tip 122 may simultaneously undergo axial displacement (arrow 160, progressing further between the two adjacent airfoils 182), angle change (arrow 170, with the tensioning of the bendable section 120 into a predefined shape), and rotational displacement (arrow 162, about a axis of the insertion tool 100) such that the tip 122 follows a complex path, curving in multiple planes.

Figure 10:
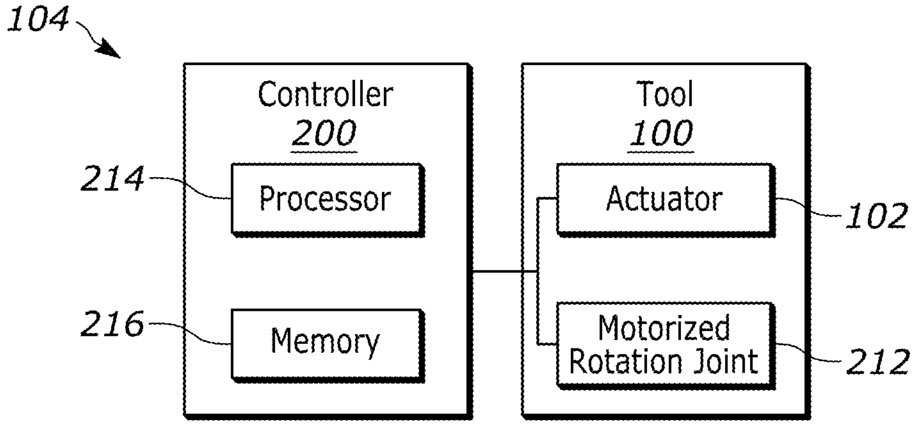
FIG. 10 is a block diagram of a controller of an insertion tool in accordance with some embodiments.

Next referring to FIG. 10, a controller 200 that may be used to actuate the insertion tool 100 according to some embodiments is shown. In the embodiment shown in FIG. 10, the rotation interface 104 (FIG. 2) includes a motorized rotation joint 212. The controller 200 includes a processor 214 executing computer executable instructions stored in memory device 216. The controller 200 outputs a signal to the motorized rotation joint 212 to cause the rotation of the bendable section 120 via the elongated section 108. In some embodiments, the controller 200 further outputs a signal to the actuator 102 to cause the extension of the bendable section 120 from the retracted state to the extended state. In some embodiments, the controller 200 may instead measure the axial displacement 154 of the elongated section 108 via a sensor and cause the rotation via the motorized rotation joint 212 according to the amount of axial displacement 154 that is manually or otherwise actuated. In some embodiments, the controller 200 may cause the rotation of the bendable section 120 according to a predetermined sequence during or after the actuation of the bendable section 120 from the retracted state to the extended state. In some embodiments, the predetermined sequence includes periods that vary in at least one of rotation speed or rotation direction. In some embodiments, the controller 200 is further configured to rotate, via the motorized rotation joint 212, the bendable section 120 according to a different predetermined sequence with the actuation of the bendable section from the extended state to the retracted state. That is, in the embodiment shown in FIG. 10, with the inclusion of the motorized rotation joint 212 in the rotation interface 104, the bendable section 120 may follow a first complex 3D path during extension and a different complex 3D path during retraction. In some embodiments, the controller 200 may further be configured to control the locking mechanism 103 to lock the insertion tool 100 at one or more positions. For example, the controller 200 may be configured to cause the locking mechanism 103 to engage once the desired axial displacement and rotation has been achieved, and cause the locking mechanism 103 to release to retract and withdraw the tool 100.

Figure 11:
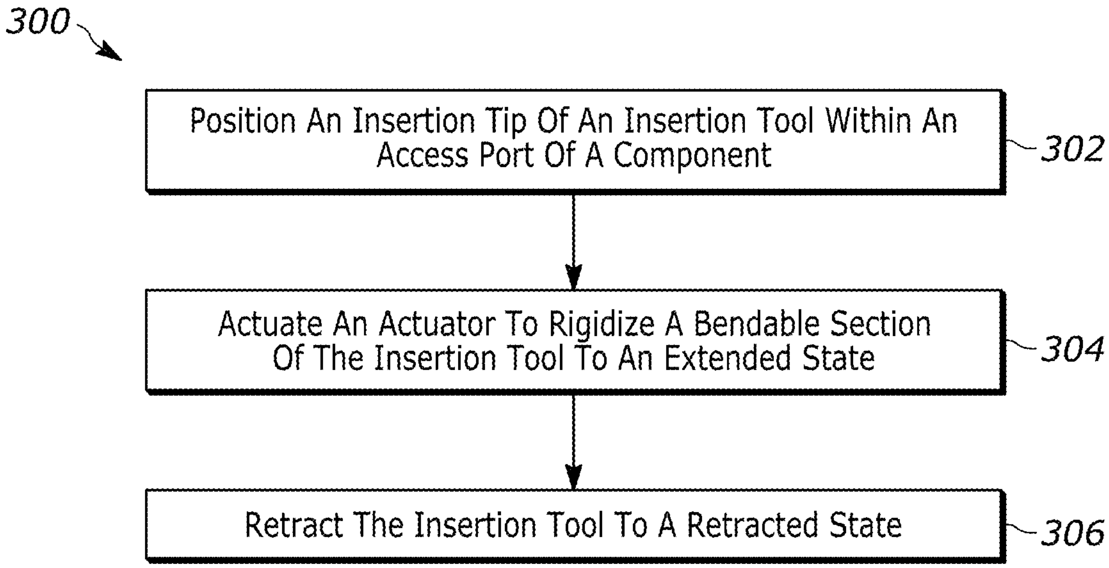
FIG. 11 is a flow chart depicting a method of operating an insertion tool in accordance with some embodiments of the present disclosure.

Referring to FIG. 11, a method 300 for performing an operation with the insertion tool 100 according to some embodiments is shown. At step 302, the insertion tip 118 of the insertion tool 100 is positioned within the access port 180 of a component of an assembled engine. At step 304, the actuator 102 is activated, which in result extends, rigidizes, and rotates the bendable section 120 to a predefined shape and predefined orientation within the component of the assembled engine. The predetermined shape and the predefined orientation may be achieved via the use of the rotation interface 104 described above with reference to FIG. 5 and via the plurality of non-planar hinge points 126 described above with reference to FIG. 6. In some embodiments, after step 304, the locking mechanism 103 may automatically or manually engage to lock the position of the elongated section 108 and hence the location and orientation of the tip of the bendable section 120. With the tip of the bendable section 120 at the predefined location and orientation, an implement inserted through the insertion tool 100 may perform an operation with the confined space. For example, the insertion tool 100 may include a camera at the tip of the bendable section 120 configured to capture images at a predefined location and angle within a turbine engine 10. At step 306, upon completion of the operation, the bendable section 120 is retracted into the retracted state to remove the bendable section 120 of the insertion tool 100 from the access port 180. In some embodiments, step 306 may be triggered by the release of the locking mechanism 103 (FIGS. 2 and 3). In some embodiments, step 306 may be caused by the decompression of the spring 114 (FIGS. 2 and 3) in the absence of a force applied by the actuator 102 and/or the locking mechanism 103. The force asserted by the spring 114 pushes the elongated section 108 towards the distal end of the tool 100 thereby pulling the bendable section back into the housing 106. In some embodiments, the rotation interface 104 may cause the rotation of the bendable section 120 in the reverse direction while the bendable section 120 retracts back into housing 106. In some embodiments, including the embodiment described with reference to FIG. 10, the complex path followed by the bendable section 120 may be different during insertion in step 304 and retraction in step 306.

The various elements and insertion paths described herein allow for the insertion tool 100 to be deployed in various nonlinear or nonplanar tool paths to accommodate complex geometry of the device being inspected, serviced, or repaired. The various elements described herein may be shaped and configured based on device, toolpath, and/or the locations of interest. This may include, for example, modifying the rotation interface 104 based on the desired insertion path and locations of interest, modifying the plurality of rigidizable links 124 to include varying lengths and curvature, and modifying the plurality of non-planar hinge points 126 both in the location of the hinges between links and the degree of flexibility of the hinges. With the devices and methods described herein, an additional axis of motion and maneuverability is provided by a rotation interface 104 on an insertion tool 100 having rigidizable links.

Further aspects of the disclosure are provided by the subject matter of the following clauses:

An insertion tool including: a housing; an elongated section at least partially within the housing; a bendable section coupled to the elongated section; an actuator configured to actuate the bendable section, via causing an axial displacement of the elongated section within the housing, from a retracted state at least partially positioned within the housing to an extended state outside of the housing; and a tensioning assembly configured to tension the bendable section into a predefined shape in the extended state; wherein the elongated section is coupled to the housing via a rotation interface configured to cause a rotation of the bendable section during the actuation of the bendable section from the retracted state to the extended state.

The insertion tool of any preceding clauses, wherein the bendable section is nonplanar when rigidized.

The insertion tool of any preceding clauses, wherein the rotation of the bendable section is around a longitudinal axis of the housing.

The insertion tool of any preceding clauses, wherein the actuation and rotation of the bendable section causes a tip of the bendable section to follow a predefined 3D complex path.

The insertion tool of any preceding clauses, wherein the rotation interface includes a cam and a follower, and the cam includes a nonlinear groove.

The insertion tool of any preceding clauses, wherein the follower of the rotation interface is on the housing and the nonlinear groove is on the elongated section.

The insertion tool of any preceding clauses, wherein the nonlinear groove includes at least one linear portion and at least one curved portion, at least two portions of different curvatures, at least one compound curve, or at least one reverse curve.

The insertion tool of any preceding clauses, wherein the amount of rotation of the bendable section is nonlinear to the amount of axial displacement of the elongated section.

The insertion tool of any preceding clauses, wherein the rotation interface is configured to cause the rotation of the bendable section with the axial displacement of the elongated section relative to the housing.

The insertion tool of any preceding clauses, wherein the actuator applies a force on the elongated section to cause the axial displacement of the elongated section relative to the housing during the actuation of the bendable section from the retracted state to the extended state.

The insertion tool of any preceding clauses, further including a locking mechanism for locking a position of the elongated section within the housing.

The insertion tool of any preceding clauses, further including a locking mechanism for locking the elongated section within the housing at two or more positions.

The insertion tool of any preceding clauses, wherein the locking mechanism is configured to automatically engage and lock the position of the elongated section upon the rotation of the bendable section to a predefined angle.

The insertion tool of any preceding clauses, further including a release switch for releasing the locking mechanism to actuate the bendable section to the retracted state.

The insertion tool of any preceding clauses, wherein the actuator includes a push interface at one end of the elongated section opposite the bendable section and extending out of the housing.

The insertion tool of any preceding clauses, wherein the housing includes an insertion tip and the bendable section is within the insertion tip in the retracted state.

The insertion tool of any preceding clauses, wherein the elongated section includes a rod coupled to the bendable section and the rod pushes into the insertion tip to actuate the bendable section to the extended state.

The insertion tool of any preceding clauses, wherein the bendable section includes a plurality of rigidizable links forming a rigidizable guide tube.

The insertion tool of any preceding clauses, wherein the plurality of rigidizable links is coupled via a plurality of non-planar hinge points.

The insertion tool of any preceding clauses, wherein the tensioning assembly includes a rope that is coupled to the bendable section, a rope connection within the elongated section, and a spring coupled to the rope connection such that with the axial displacement of the elongated section, tensioning force is applied to the bendable section via the rope and the spring.

The insertion tool of any preceding clauses, wherein the rope is inserted through an opening within the elongated section.

The insertion tool of any preceding clauses, wherein the spring is positioned around a portion of the elongated section and asserts a return force between the housing and the elongated section opposite to force applied by the actuator to retract the bendable section in the absence of the force from the actuator.

The insertion tool of any preceding clauses, wherein openings in the elongated section and the bendable section form a guide path through which an implement can be routed to a tip of the bendable section.

The insertion tool of any preceding clauses, wherein the implement includes at least one of an imaging tool, a scanning tool, a drilling tool, a grinding tool, a spray tool, an inspection tool, a resurfacing tool, a washing tool, a cleaning tool, a eddy current imagining tool, or a fluid tube.

The insertion tool of any preceding clauses, wherein the rotation interface includes a motorized rotation joint, and a controller is configured to rotate, via the motorized rotation joint, the bendable section according to a predetermined sequence with the actuation the bendable section from the retracted state to the extended state.

The insertion tool of any preceding clauses, wherein the predetermined sequence includes periods that vary in at least one of rotation speed or rotation direction.

The insertion tool of any preceding clauses, wherein the controller is further configured to rotate, via the motorized rotation joint, the bendable section according to a different predetermined sequence with the actuation of the bendable section from the extended state to the retracted state.

A method, including: positioning a insertion tip of the insertion tool of any preceding clauses within an access port of the assembled engine; and actuating the actuator to extend, rigidize, and rotate the bendable section to the predefined shape and a predefined orientation within the assembled engine.

What is claimed is:

1. An insertion tool comprising:

a housing;

an elongated section at least partially within the housing;

a bendable section coupled to the elongated section, wherein the elongated section and the bendable section include a guide path for an implement for gas turbine engine part inspection, service, or repair, the guide path extends from a proximal end of the insertion tool, through the elongated section, to a distal tip of the bendable section;

an actuator configured to actuate the bendable section from a retracted state at least partially positioned within the housing to an extended state outside of the housing, via causing an axial displacement of the elongated section within the housing; and a tensioning assembly configured to tension the bendable section into a predefined shape in the extended state;

wherein the elongated section is coupled to the housing via a rotation interface configured to cause a rotation of the bendable section during the actuation of the bendable section from the retracted state to the extended state, wherein the rotation interface is an interface between the housing and the elongated section comprising a cam and a follower, and wherein the cam comprises a nonlinear groove in the housing or the elongated section.

2. The insertion tool of claim 1, wherein the bendable section is nonplanar when rigidized.

3. The insertion tool of claim 1, wherein the rotation of the bendable section is around a longitudinal axis of the housing.

4. The insertion tool of claim 1, wherein the follower of the rotation interface is on the housing and the nonlinear groove is on the elongated section.

5. The insertion tool of claim 1, wherein the nonlinear groove comprises at least one linear portion and at least one curved portion, at least two portions of different curvatures, at least one compound curve, or at least one reverse curve.

6. The insertion tool of claim 1, wherein the amount of rotation of the bendable section is nonlinear to the amount of axial displacement of the elongated section.

7. The insertion tool of claim 1, wherein the rotation interface is configured to cause the rotation of the bendable section with the axial displacement of the elongated section relative to the housing.

8. The insertion tool of claim 1, further comprising a locking mechanism for locking a position of the elongated section within the housing.

9. The insertion tool of claim 8, wherein the locking mechanism is configured to automatically engage and lock the position of the elongated section upon the rotation of the bendable section to a predefined angle.

10. The insertion tool of claim 8, further comprising a release switch for releasing the locking mechanism to actuate the bendable section to the retracted state.

11. The insertion tool of claim 1, wherein the housing comprises an insertion tip and the bendable section is within the insertion tip in the retracted state.

12. The insertion tool of claim 11, wherein the elongated section comprises a rod coupled to the bendable section and the rod pushes into the insertion tip to actuate the bendable section to the extended state.

13. The insertion tool of claim 1, wherein the bendable section comprises a plurality of rigidizable links forming a rigidizable guide tube.

14. The insertion tool of claim 13, wherein the plurality of rigidizable links is coupled via a plurality of non-planar hinge points.

15. The insertion tool of claim 1, wherein the tensioning assembly comprises:

a rope coupled to the bendable section;

a rope connection within the elongated section; and a spring coupled to the rope connection such that with the axial displacement of the elongated section, tensioning force is applied to the bendable section via the rope and the spring.

16. The insertion tool of claim 15, wherein the spring is positioned around a portion of the elongated section and asserts a return force between the housing and the elongated section opposite to force applied by the actuator to retract the bendable section in the absence of the force from the actuator.

17. The insertion tool of claim 1, wherein the rotation interface comprises a motorized rotation joint, and a controller is configured to rotate, via the motorized rotation joint, the bendable section according to a predetermined sequence, with the actuation the bendable section from the retracted state to the extended state.

18. The insertion tool of claim 17, wherein the controller is further configured to rotate, via the motorized rotation joint, the bendable section according to a different predetermined sequence, with the actuation of the bendable section from the extended state to the retracted state.

19. A method of servicing an assembled engine with the insertion tool of claim 1, comprising:

positioning an insertion tip of the insertion tool within an access port of the assembled engine; and actuating the actuator to extend, rigidize, and rotate the bendable section to the predefined shape and a predefined orientation within the assembled engine.

* * * * *